(12) United States Patent
Ge et al.

(10) Patent No.: US 11,698,047 B2
(45) Date of Patent: Jul. 11, 2023

(54) METHOD AND SYSTEM FOR VALVE STICKING DETECTION, PREVENTION, OR CORRECTION

(71) Applicant: Caterpillar Inc., Peoria, IL (US)

(72) Inventors: Xinyu Ge, Peoria, IL (US); Brian P. Brennan, Steger, IL (US); James H. Mutti, Jr., Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/349,720

(22) Filed: Jun. 16, 2021

(65) Prior Publication Data

US 2022/0403804 A1 Dec. 22, 2022

(51) Int. Cl.
| | |
|---|---|
| *F02M 26/50* | (2016.01) |
| *F02M 26/23* | (2016.01) |
| *F02M 26/33* | (2016.01) |
| *F02M 26/49* | (2016.01) |
| *F02M 26/53* | (2016.01) |
| *F02D 41/00* | (2006.01) |
| *F02D 41/14* | (2006.01) |

(52) U.S. Cl.
CPC ......... *F02M 26/50* (2016.02); *F02D 41/0002* (2013.01); *F02D 41/0055* (2013.01); *F02D 41/0077* (2013.01); *F02D 41/1446* (2013.01); *F02M 26/23* (2016.02); *F02M 26/33* (2016.02); *F02M 26/49* (2016.02); *F02M 26/53* (2016.02); *F02D 2041/0017* (2013.01); *F02D 2200/021* (2013.01)

(58) Field of Classification Search
CPC ........ F02M 26/23; F02M 26/33; F02M 26/49; F02M 26/50; F02M 26/53; F02D 41/0002; F02D 41/0055; F02D 41/0077; F02D 41/1446; F02D 2041/0017
See application file for complete search history.

(56) References Cited

U.S. PATENT DOCUMENTS

| | | | |
|---|---|---|---|
| 7,832,373 | B2 | 11/2010 | Enomoto |
| 7,918,084 | B2 | 4/2011 | Tahara |
| 8,109,258 | B2 | 2/2012 | Allain |
| 8,601,813 | B2 | 12/2013 | Shutty et al. |

(Continued)

FOREIGN PATENT DOCUMENTS

| | | |
|---|---|---|
| EP | 1729004 B1 | 3/2010 |
| FR | 2833653 B1 | 7/2004 |

(Continued)

OTHER PUBLICATIONS

European Search Report for Int'l. Patent Appln. No. 22173652.3-1004 dated Nov. 4, 2022 (6 pgs).

*Primary Examiner* — Logan M Kraft
*Assistant Examiner* — Anthony L Bacon
(74) *Attorney, Agent, or Firm* — Bookoff McAndrews, PLLC

(57) ABSTRACT

A method for cleaning an exhaust gas recirculation (EGR) valve includes scheduling a cleaning for the EGR valve, and receiving a signal indicative of a temperature of exhaust gas produced with an internal combustion engine. The method may also include generating a command to actuate an intake throttle valve to a restrictive position to increase the temperature of the exhaust gas for cleaning the EGR valve, and generating a signal to repeatedly actuate the EGR valve.

20 Claims, 4 Drawing Sheets

(56) References Cited

U.S. PATENT DOCUMENTS

| | | |
|---|---|---|
| 9,181,904 B2 | 11/2015 | Jankovic et al. |
| 10,408,171 B2 | 9/2019 | Dixon et al. |
| 11,339,731 B2* | 5/2022 | Rahm .................... F02M 26/36 |
| 11,346,309 B2* | 5/2022 | Rahm .................... F02M 26/50 |
| 2002/0011241 A1* | 1/2002 | Cook ................ F02M 25/0836 |
| | | 123/520 |
| 2006/0278204 A1* | 12/2006 | Hatano .................. F02M 26/67 |
| | | 165/103 |
| 2012/0323465 A1* | 12/2012 | Peters .................... F02M 26/43 |
| | | 701/104 |
| 2018/0106220 A1* | 4/2018 | Yoshioka ............... F16K 1/221 |
| 2018/0119652 A1 | 5/2018 | Dixon |
| 2018/0142635 A1 | 5/2018 | Noh |
| 2019/0195153 A1* | 6/2019 | Dudar ................ F02D 41/1448 |
| 2019/0293035 A1 | 9/2019 | Miyashita |
| 2019/0345882 A1* | 11/2019 | Yoshioka ............... F02M 26/50 |
| 2021/0180533 A1* | 6/2021 | Rahm .................... F02M 26/36 |
| 2021/0310448 A1* | 10/2021 | Rahm .................... F02M 26/50 |
| 2022/0056854 A1* | 2/2022 | Robel .................... F02B 37/24 |

FOREIGN PATENT DOCUMENTS

| | | |
|---|---|---|
| JP | 2003314377 A | 11/2003 |
| JP | 2005344677 A | 12/2005 |
| WO | 2007/089771 A2 | 8/2007 |

\* cited by examiner

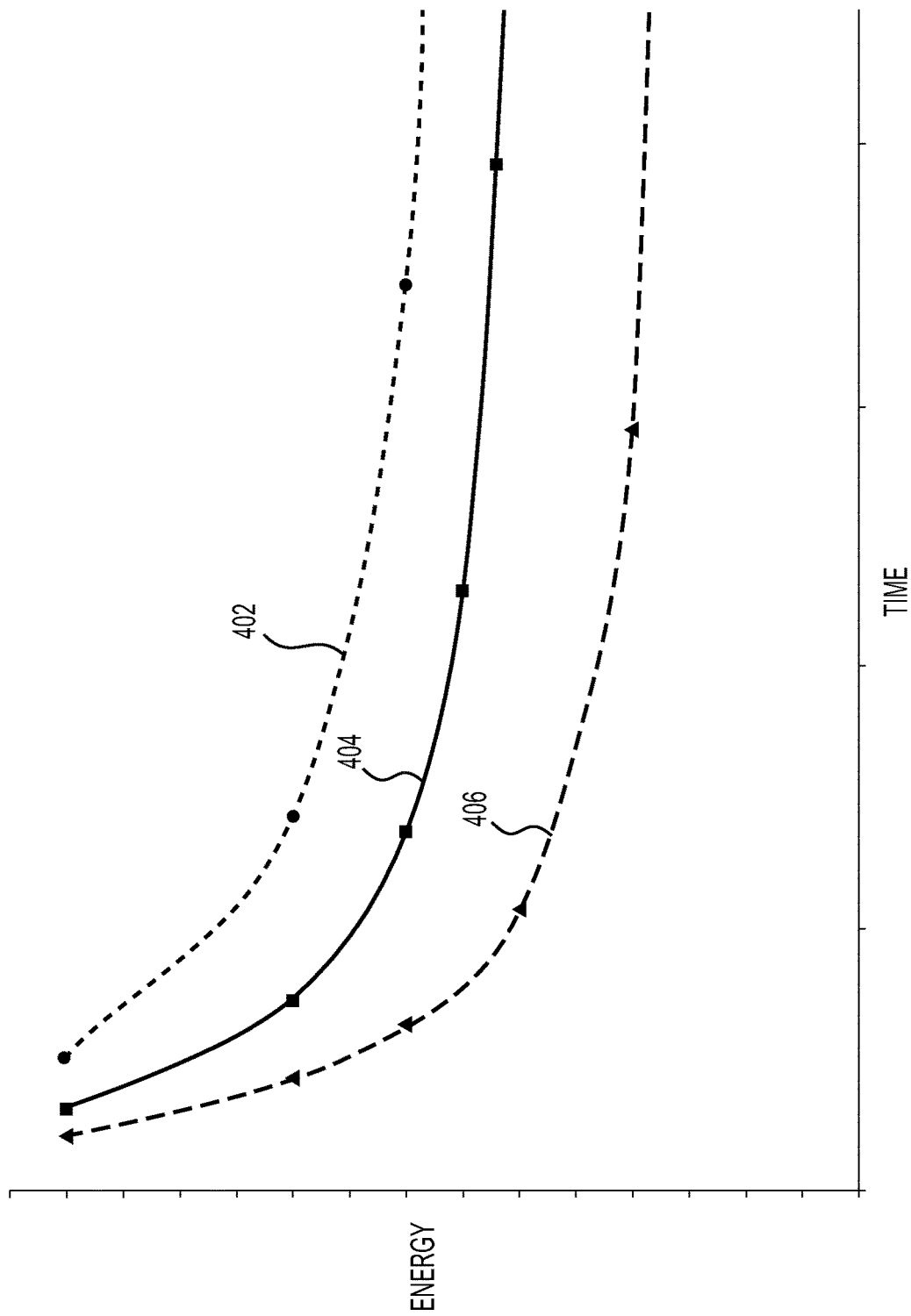

METHOD AND SYSTEM FOR VALVE STICKING DETECTION, PREVENTION, OR CORRECTION

TECHNICAL FIELD

The present disclosure relates generally to internal combustion engines, and more particularly, to methods and systems for control of exhaust gas recirculation valves of internal combustion engines.

BACKGROUND

Internal combustion engines are employed in numerous applications including, for example, vehicles, mobile machines, and stationary machines. These engines, including diesel engines, have become increasingly efficient and clean as sophisticated engine control systems enable precise control over air intake, fuel injection, combustion, and exhaust treatment (e.g., to remove NOx generated by the combustion of fuel). The introduction of exhaust gas recirculation (EGR) valves to diesel engines in particular has improved the ability of diesel engine control systems to reduce the quantity of generated NOx. However, EGR valves introduce additional components and complexity, including the EGR valve itself and an EGR cooler which lowers the temperature of the exhaust gases. The EGR valve, which includes moving parts, increases maintenance requirements of the engine and can negatively impact engine performance, potentially severely, in the event of a malfunction.

Over time, EGR valves tend to accumulate deposits generated as combustion products from the internal combustion engine. The deposits can interact with moisture present in the air, creating a film of material that can eventually impede the operation of the EGR valve. In some cases, deposits prevent opening of the EGR valve from a closed state. In others, deposits prevent an EGR valve from fully closing, causing leakage across the EGR valve in situations where the valve is commanded to be fully closed.

An exemplary method of cleaning an exhaust gas recirculation valve is disclosed in U.S. Pat. No. 10,408,171 B2 ("the '171 patent") to Dixon et al. The method described in the '171 patent determines when cleaning is required and performs cleaning by allowing very hot exhaust gas to flow through the EGR valve. While the method described in the '171 patent may allow hot exhaust gas to remove some accumulated material from an EGR valve, it may be unable to identify EGR sticking in at least some circumstances and may be expensive, complex, difficult to package within a machine, or combinations thereof.

The disclosed methods and systems may solve one or more of the problems set forth above and/or other problems in the art. The scope of the current disclosure, however, is defined by the claims, and not by the ability to solve any specific problem.

SUMMARY

In one aspect, a method for cleaning an exhaust gas recirculation (EGR) valve may include scheduling a cleaning for the EGR valve, and receiving a signal indicative of a temperature of exhaust gas produced with an internal combustion engine. The method may also include generating a command to actuate an intake throttle valve to a restrictive position to increase the temperature of the exhaust gas for cleaning the EGR valve, and generating a signal to repeatedly actuate the EGR valve.

In another aspect, a method for cleaning an exhaust gas recirculation (EGR) valve may include generating a command to close the EGR valve and determining EGR leakage while the EGR valve is commanded to be closed, and in response to determining the EGR leakage, scheduling a cleaning for the EGR valve. The method may also include partially closing an intake throttle valve to facilitate the cleaning for the EGR valve, and repeatedly generating a signal for actuating the EGR valve.

In yet another aspect, a system for removing material or preventing accumulation of material on an exhaust gas recirculation (EGR) valve may include an internal combustion engine, an intake throttle valve, and the EGR valve. The system may also include a temperature sensor configured to generate a temperature signal indicating a temperature of exhaust gas and a controller. The controller may be configured to: receive the temperature signal, generate a command to actuate the intake throttle valve to a restrictive position, and generate a command to repeatedly actuate the EGR valve while the intake throttle valve is in the restrictive position.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 is a chart illustrating a plurality of exemplary actuation signals for temperature conditions of the internal combustion engine system.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
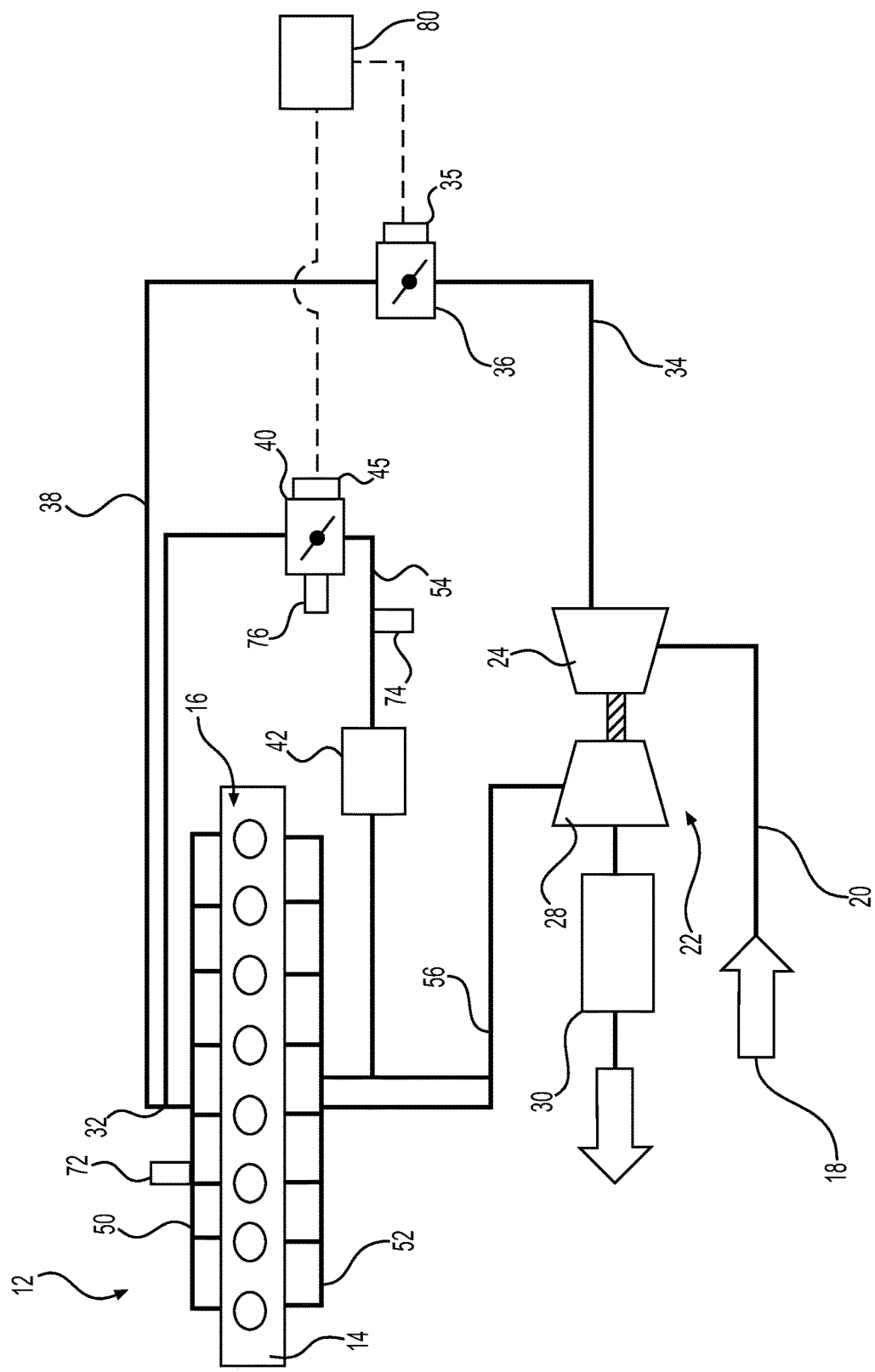
FIG. 1 is a block diagram of an internal combustion engine system for preventing or removing EGR valve deposits, contamination, and/or lacquer according to aspects of the present disclosure.

FIG. 1 illustrates an exemplary exhaust gas recirculation (EGR) valve monitoring and cleaning system 12. In the illustrated configuration, EGR valve monitoring and cleaning system 12 includes an internal combustion engine 14, a turbocharger 22, an intake throttle valve (ITV) 36, an EGR valve 40, and an engine control module 80. System 12 may also include components for supplying air to internal combustion engine 14, components for receiving exhaust produced by combustion within engine 14, and sensors for monitoring the status of components of system 12.

An air intake 18 of system 12 may be connected to an intake passage 20 that is configured to receive engine intake air via an air filter, for example. Intake passage 20 may be connected to an inlet of a compressor 24 of turbocharger 22. An outlet of compressor 24 may be connected to a compressed air passage 34, which is connected to ITV 36 having an actuator 35. A downstream engine supply passage 38 may connect to an intake manifold 50 of engine 14, which is in fluid communication with a plurality of cylinders 16. Cylinders 16 may each receive fuel (e.g., diesel fuel) from a respective fuel injector (not shown). While engine 14 may be configured to combust diesel fuel, engine 14 may be configured to combust gasoline, and/or gaseous fuel such as natural gas, either alone or in a dual fuel system that also combusts diesel fuel.

Exhaust manifold 52 may be in fluid communication with cylinders 16 via one or respective exhaust valves in a known manner. One, two, or more exhaust paths may extend from exhaust manifold 52 to connect exhaust manifold to EGR valve 40 and turbocharger 22, respectively. For example, a first exhaust passage 54 may extend from exhaust manifold 52 to a mixing point 32 at a location connected to intake manifold 50 and downstream of ITV 36. In other exemplary configurations, first exhaust passage 54 may instead connect to compressed air passage 34 such that mixing point 32 is upstream of ITV 36. First exhaust passage 54 may include an EGR cooler 42 upstream of EGR valve 40. A second exhaust passage 56 may be connected downstream of exhaust manifold 52 and to an inlet of a turbine 28 of turbocharger 22. An outlet of turbine 28 may be in communication with one or more aftertreatment devices 30. Aftertreatment devices 30 may include one or more catalysts, particulate filters, etc., that treat exhaust gas generated by engine 14.

EGR valve 40 may be an electromechanical valve having an electrical actuator 45 that causes motion of a movable valve element. In one example, EGR valve 40 may be a butterfly valve that includes a plate that, during normal operation, moves in response to the actuation of actuator 45. In one embodiment, EGR valve 40 and ITV 36 may be the same type of valve (e.g., a butterfly valve).

A sensor system of EGR valve monitoring and cleaning system 12 may include an intake airflow sensor 72 (e.g., a mass airflow sensor), an exhaust temperature sensor 74, and one or more exhaust emissions sensors, such as an exhaust pressure sensor 76. While three exemplary sensors are illustrated in FIG. 1, as understood, system 12 may include one or more additional sensors, such as sensor(s) for aftertreatment devices 30, an engine speed sensor, a temperature sensor associated with intake manifold 50, a temperature sensor associated with exhaust manifold 52, other temperature and/or pressure sensors, fuel system sensors, and others. Each sensor 72, 74, and 76 may be in communication with ECM 80 and may be configured to generate a signal that is received by ECM 80 (signal lines between ECM 80 and sensors 72, 74, and 76 being omitted from FIG. 1). The signals generated by sensors 72, 74, and 76 may allow ECM 80 to monitor the performance of aspects of system 12.

Intake airflow sensor 72 may be secured at a suitable location upstream (not shown) or downstream of ITV 36 and may be configured to generate a signal indicative of a quantity of air pressure and/or airflow (e.g., a mass flow rate) towards engine 14. In the example illustrated in FIG. 1, sensor 72 is associated with intake manifold 50. One or more exhaust temperature sensors 74 may be configured to detect information indicative of a temperature of exhaust gas. In the example shown in FIG. 1, exhaust temperature sensor 74 may be configured to measure a temperature of exhaust downstream of EGR cooler 42. However, in other implementations, exhaust temperature sensor 74 may be located on aftertreatment devices 30, upstream of EGR cooler 42, or may be positioned in a system 12 that does not include an EGR cooler 42, and may therefore detect a temperature of uncooled exhaust. Exhaust pressure sensor 76 may be configured to detect a pressure of exhaust downstream of engine 14. Exhaust pressure sensor 76 may be a pressure sensor or plurality of pressure sensors configured to output a signal to ECM 80 useful for determining a pressure drop across EGR valve 40.

ECM 80 may be configured to identify a stuck condition of EGR valve 40 and to periodically perform a cleaning operation for EGR valve 40. In particular, ECM 80 may be configured to identify a particular type of stuck condition, such as a condition where EGR valve 40 is stuck in an open (e.g., partially-open) position and a condition where EGR valve 40 is stuck in a closed position. ECM 80 may also facilitate a process for freeing EGR valve 40 and restoring the ability of EGR valve 40 to freely open and close.

Figure 2:
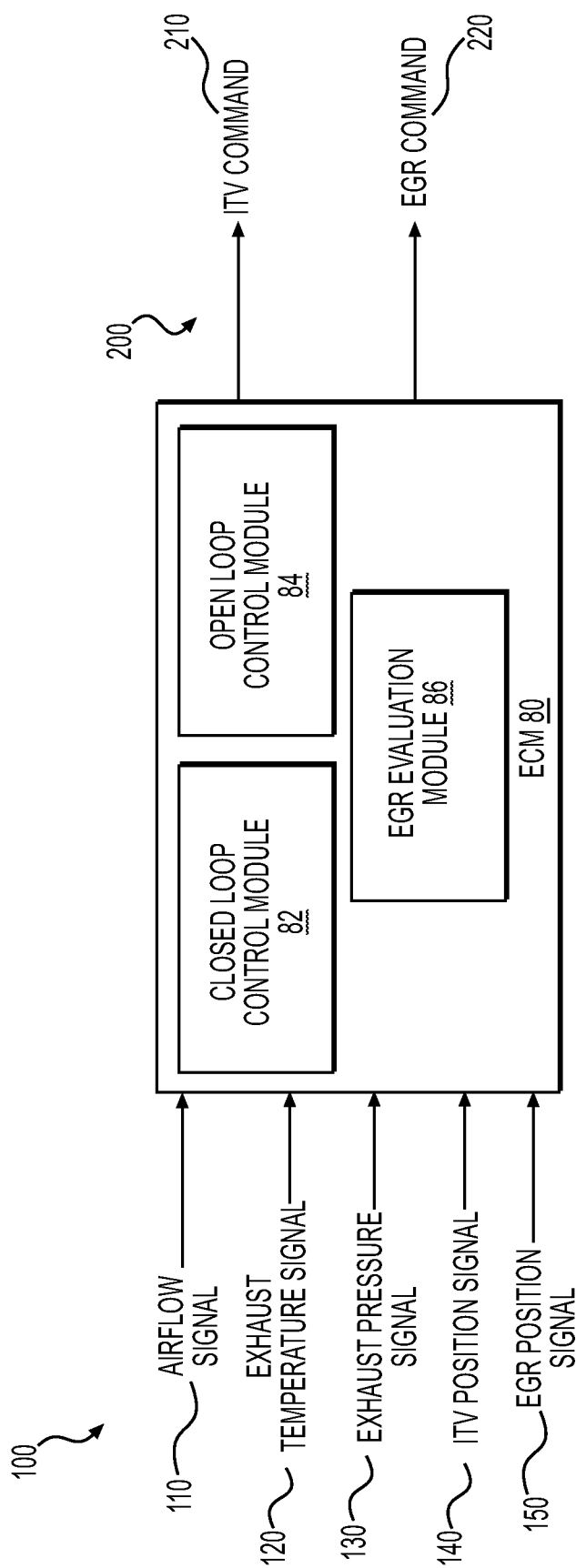
FIG. 2 is a block diagram of an exemplary configuration of an engine control module configured to facilitate prevention or removal of EGR valve deposits, contamination, and/or lacquer.

In order to achieve these functions, ECM 80 may be programmed to implement a closed loop control module 82 (FIG. 2), an open loop control module 84 (FIG. 2), and an EGR evaluation module 86 (FIG. 2). ECM 80 may employ these functions to schedule EGR valve 40 cleaning, to identify when EGR valve 40 is stuck, and to control positions of ITV 36 and EGR valve 40 during normal operation of system 12 and in cleaning operations in which deposits of material, contamination, and/or lacquer, referred to herein as "deposits," are removed from EGR valve 40 by actuating EGR valve 40 and ITV 36, as described below. If desired, ECM 80 may generate additional signals (not shown) for controlling other aspects of system 12 and/or engine 14, such as an amount of fuel delivered to cylinders 16, a timing of the injection of this fuel, a transmission system, a hydraulic system, etc.

ECM 80 may embody a single microprocessor or multiple microprocessors that receive inputs and generate outputs. ECM 80 may include a memory, a secondary storage device, a processor, such as a central processing unit or any other means for accomplishing a task consistent with the present disclosure. The memory or secondary storage device associated with ECM 80 may store data and software to allow ECM 80 to perform its functions including the functions described with respect to FIG. 2 and method 300 described below. Numerous commercially available microprocessors can be configured to perform the functions of ECM 80. Various other known circuits may be associated with ECM 80, including signal-conditioning circuitry, communication circuitry, and other appropriate circuitry.

FIG. 2 is a block diagram of an exemplary configuration of ECM 80 that may enable EGR valve monitoring and cleaning by controlling the positions of ITV 36 and EGR valve 40 and if desired, other components associated with engine 14. ECM 80 may receive a plurality of inputs 100 and may generate outputs 200 including commands for actuators of system 12, including actuator 45 for positioning a valve plate of EGR valve 40. As shown in FIG. 2, components or modules of ECM 80 may include closed loop control module 82, open loop control module 84, and EGR evaluation module 86.

Inputs 100 to ECM 80 may include sensed values, calculated values, or both, these values being useful for modules 82, 84, and 86 of ECM 80. Inputs 100 may include an airflow signal 110, generated by intake airflow sensor 72, that may indicate a quantity and/or pressure of airflow to engine 14. An exhaust temperature signal 120, generated by exhaust temperature sensor 74, may indicate a temperature of exhaust produced by combustion of fuel within cylinders 16. In particular, exhaust temperature signal 120 may indicate a temperature of exhaust after this exhaust exits EGR cooler 42. An exhaust pressure signal 130, generated by exhaust pressure sensor 76, may indicate a pressure drop across EGR valve 40. Inputs 100 may also include position feedback for ITV 36, ITV position signal 140, and position feedback for EGR valve 40, EGR position signal 150.

Closed loop control module 82 may configure ECM 80 to perform control of EGR valve 40 during normal operation of system 12. ECM 80 may, via module 82, perform closed-loop (e.g., proportional-integral-derivative) control of EGR valve 40. Closed-loop control may include monitoring and changing a position of EGR valve 40 based on a desired amount of EGR associated with current engine conditions. This may include determining a desired position of EGR valve 40 with a look-up table, a map, etc. The position of EGR valve 40 may also be modified with closed loop control module 82 based on feedback information received by ECM 80 (e.g., from one or more sensors and/or from position information from the actuator for EGR valve 40).

Open loop control module 84 may enable ECM 80 to perform a cleaning operation of EGR valve 40 in which the position of valve 40 is opened and closed repeatedly. During open loop control, EGR valve 40 may be operated in a manner that is independent of a desired amount of EGR associated with current engine conditions. Open loop control may include repeatedly generating high-current signals to actuator 45 of EGR valve 40. These high-current signal may be relatively high-duty pulse width modulation (PWM) signals or a series of continuous signals. These signals may allow actuator 45 to free a stuck EGR valve 40 mechanism (e.g., a butterfly valve plate) while high-temperature exhaust gas is directed toward EGR valve 40.

EGR evaluation module 86 may allow ECM 80 to determine whether to operate EGR valve 40 according to closed loop control module 82 or according to open loop control module 84. EGR evaluation module 86 may allow ECM 80 to perform diagnostics to determine when EGR valve 40 requires cleaning. EGR evaluation module 86 may further allow ECM 80 to determine whether current conditions are satisfactory for performing a cleaning operation. If desired, EGR evaluation module 86 may allow ECM 80 to determine whether sensors associated with evaluating EGR valve 40 are operating as expected and to generate a notification to an operator when an estimated exhaust flow rate indicates that one or more sensors of system 12 are operating in an undesirable manner.

ECM 80 may generate, as outputs 200, an ITV command 210 and an EGR command 220. ITV command 210 may be generated by ECM 80 to issue a command for actuating ITV 36 and positioning ITV 36 in a desired manner. EGR command 220 may be generated by ECM 80 to issue a command for driving actuator 45 and positioning EGR valve 40. One or both of commands 210 and 220 may be generated directly from ECM 80 to respective actuators of ITV 36 and EGR valve 40, or may be generated to an intermediate controller in communication with the actuators of ITV 36 and EGR valve 40.

INDUSTRIAL APPLICABILITY

The disclosed aspects of EGR valve monitoring and cleaning system 12 may be employed in a variety of engines, machines and/or vehicles in which these engines generate power to move the machine, control hydraulic systems or otherwise position one or more implements, generate electrical energy, etc. EGR valve monitoring and cleaning system 12 may be included in any machine having an internal combustion engine that includes an EGR valve or similar valve, to monitor a status of the valve and to perform cleaning operations according to a schedule and/or according to need.

During the operation of system 12, engine 14 combusts fuel in cylinders 16 according to requests received by ECM 80. These requests may correspond to a position of an accelerator pedal or control handle, a requested amount of power, a requested torque, etc., and may be generated by controlling various factors of engine 14 including quantity of injected fuel, fuel injection timing, a position of ITV 36, etc. Over time, the combustion of fuel and operation in relatively cold conditions may result in the accumulation of deposits in EGR valve 40. These deposits can cause sticking, particularly when moisture is present in the EGR components of system 12. While ECM 80 may periodically clean or "sweep" EGR valve 40, deposits, may accumulate in certain circumstances, such as when engine 14 is operated in a relatively low load condition for a period of time. When EGR evaluation module 86 of ECM 80 determines that EGR valve 40 has become stuck or will likely become stuck, system 12 may simultaneously actuate both ITV 36 and EGR valve 40 to encourage generation of high-temperature exhaust gas. This gas may facilitate the removal of deposits, while repeated actuation of EGR valve 40 may free a stuck valve, allowing system 12 and EGR valve 40 to return to a normal operating condition without the need to replace or manually clean EGR valve 40.

Figure 3:
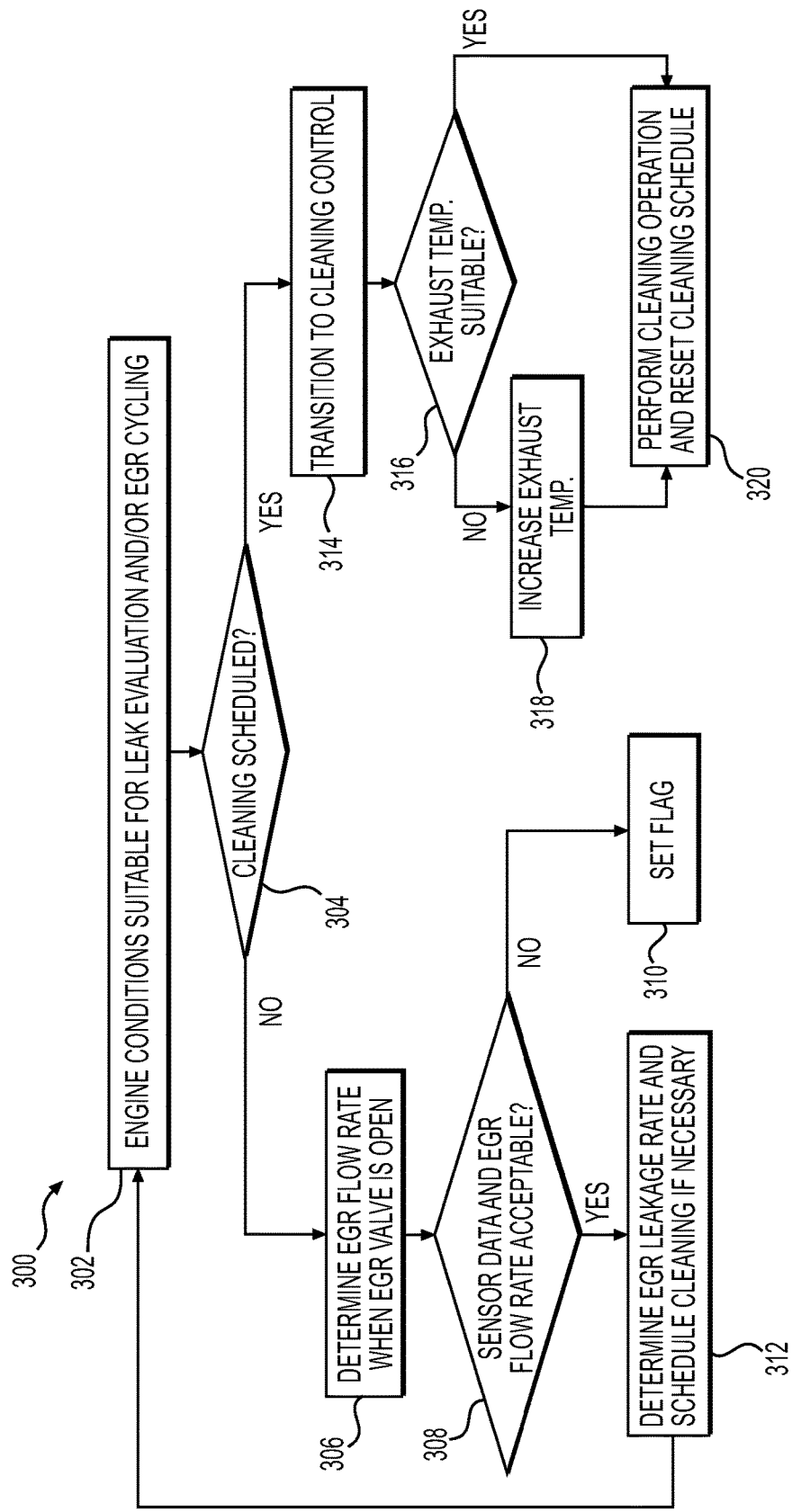
FIG. 3 is a flowchart of an exemplary process for cleaning an EGR valve according to aspects of the present disclosure.

FIG. 3 is a flowchart illustrating an exemplary method 300 for cleaning an EGR valve 40. Method 300 may include scheduling cleaning of EGR valve 40 (e.g., steps 302-312), receiving signal(s) indicative of temperature of exhaust gas produced by internal combustion engine 14 (e.g., step 316), generating command(s) to actuate ITV 36 to a more restrictive position to increase exhaust gas temperature when necessary (e.g., step 318), and generating a signal to repeatedly actuate (e.g., signals to open and close) EGR valve 40 (e.g., step 320).

A step 302 may include waiting until engine conditions are appropriate for evaluating EGR leakage, EGR cleaning (e.g., a process for preventing accumulation of deposits, contamination, lacquer, or combination of them and/or for removing deposits, contamination, lacquer or combination thereof from EGR valve 40), or both. Step 302 may include waiting for engine 14 to operate in a steady state condition, such as an approximately constant engine speed, load, etc. Step 302 may also include waiting until engine 14 operates under predetermined conditions that are suitable for evaluating EGR leakage and/or for cleaning EGR valve 40. When these conditions are present, engine 14 may be operating in an "opportunity window" that allows leakage testing and/or EGR valve cleaning. An opportunity window may correspond to desired ranges or conditions of one or more engine parameters. For example, suitable engine parameters for determining whether engine 14 is in an opportunity window may include injection timing, fuel injection pressure, engine speed, intake manifold pressure, pressure drop across EGR valve 40, injection mode (e.g., whether a pilot injection and/or post-main injection is performed), etc.

A step 304 may be performed when engine 14 is in a steady state condition and within an opportunity window. In step 304, ECM 80 may determine whether a cleaning is scheduled for EGR valve 40. When a cleaning is scheduled, one or more of steps 314-320 may be performed in order to perform a cleaning routine. When a cleaning is not scheduled, steps 306-312 may be performed to determine whether cleaning should be performed immediately or scheduled for the future.

When cleaning is not presently scheduled, a step 306 may be performed to calculate an EGR flow rate with EGR evaluation module 86 of ECM 80. This may be performed by generating an EGR command 220 to position EGR valve 40 in a partially-open or fully-open position. For example, an EGR command 220 generated in step 306 may correspond to an EGR position that is at least 10% open. While EGR valve 40 is commanded to be in this position, ECM 80 may calculate an estimated EGR flow rate based on exhaust temperature signal 120 and exhaust pressure signal 130 from exhaust temperature sensor 74 and exhaust pressure sensor 76, respectively. If desired, airflow signal 110 from intake airflow sensor 72 may also be used to estimate EGR flow rate. In an exemplary embodiment, EGR flow rate may be calculated based on EGR pressure information (absolute pressure and/or a pressure difference across EGR valve 40 represented by exhaust pressure signal 130), exhaust temperature (a temperature downstream or at an outlet of EGR cooler 42 represented by exhaust temperature signal 120), and intake manifold air pressure (IMAP represented by airflow signal 110).

The EGR flow rate calculated in step 306 may be compared to an expected EGR flow rate retrieved from a map, for example, by EGR evaluation module 86. The expected EGR flow rate may include a range of expected EGR flow rates that are considered acceptable for the current conditions of system 12. As deposits, contamination, and/or lacquer present on EGR valve 40 will not likely affect the EGR flow rate while valve 40 is open, ECM 80 may be configured to determine whether the information received by sensors 72, 74, and/or 76 is acceptable in step 308. For example, when sensors 72, 74, and/or 76 result in a significantly higher EGR flow rate as compared to the expected EGR flow rate, ECM 80 may determine that the sensor data is unacceptable (e.g., due to a likely malfunction of one or more of these sensors) and perform a step 310 described below. Step 308 may further include determining whether the estimated EGR flow rate is acceptable. This may include comparing the estimated EGR flow rate to a range of acceptable (e.g., plausible) values. When the estimated EGR flow is outside of these values, step 310 may be performed.

In step 310, ECM 80 may store information indicative of the unacceptable condition identified in steps 306 and 308. For example, when it is determined that a sensor is likely malfunctioning, corresponding information may be stored as a flag in a memory associated with ECM 80. Based on this information, a notification may be generated to an operator of engine 14. This notification may indicate a sensor malfunction, for example, and may identify the suspected malfunctioning sensor when possible (e.g., when a particular signal 110, 120, 130 indicates an extreme value).

When the sensor data and the calculated EGR flow rate are both found to be acceptable in step 308, a step 312 may be performed to determine whether deposits have likely accumulated on EGR valve 40 by determining EGR leakage. Step 312 may include generating an EGR command 220 to place EGR valve 40 in a fully closed position. With EGR valve 40 in this position, EGR flow rate may be calculated, this calculated flow rate being an EGR leakage rate as the expected EGR flow rate with valve 40 closed is zero or approximately zero. Thus, the presence of a significant amount of EGR flow indicates EGR leakage caused by deposits that prevent full closing of EGR valve 40. In order to evaluate whether a calculated or estimated EGR leakage rate is acceptable, the value of the EGR leakage rate may be compared to a predetermined acceptable EGR leakage rate.

In response to the detection of unacceptable EGR leakage, step 312 may include scheduling a time to perform a cleaning operation of EGR valve 40. This time may be based on the severity of the determined leakage. For example, when leakage is severe, method 300 may proceed to step 314, described below, immediately. However, when EGR evaluation module 86 determines that leakage is minor but slowly increasing, a cleaning may be scheduled for a future time, such as a time where the leakage is expected to become moderate. Cleaning may also be scheduled at regular intervals (e.g., operation hours) in addition to the scheduling performed in step 312 in response to detected leakage.

When a cleaning is scheduled, the determination of step 304 may be affirmative, and step 314 may be performed. Step 314 may include transitioning to a cleaning control in which ECM 80 monitors exhaust temperature in preparation to generate open loop commands with open loop control module 84.

A step 316 of the cleaning control may include determining whether a current exhaust temperature is suitable for cleaning EGR valve 40. In the exemplary system 12 shown in FIG. 1, this may include determining a temperature of exhaust gas that exits EGR cooler 42 based on exhaust temperature signal 120 received by ECM 80 from exhaust temperature sensor 74 downstream of EGR cooler 42. This temperature may be compared to a predetermined temperature threshold or range of suitable temperatures. When the temperature is determined to be suitable, step 320 may be performed, as described below. However, when the detected exhaust temperature is not suitable for cleaning EGR valve 40, step 318 may be performed to increase the temperature of exhaust gas.

The predetermined temperature threshold may be a minimum desired temperature of exhaust gas as measured downstream or at an outlet of EGR cooler 42, as shown by exhaust temperature sensor 74 in FIG. 1. An exemplary minimum desired threshold for exhaust gas downstream of EGR cooler 42 may be approximately 100 degrees Celsius. In some aspects, the minimum desired temperature for exhaust gas downstream of an EGR cooler may be higher, such as approximately 140 degrees Celsius. In other configurations, the minimum desired temperature may be associated with exhaust gas that has not been cooled by an EGR cooler, such as exhaust gas present within exhaust manifold 52. The minimum desired temperature threshold may be approximately 500 degrees Celsius when monitoring the temperature of exhaust gas that has not been cooled.

In step 318, ECM 80 may cause a temperature of exhaust gas to increase over time by actuating ITV 36. In particular, ECM 80 may generate an ITV command 210 that causes ITV 36 to move to a more restrictive position that reduces an amount of air flow into cylinders 16 of engine 14. This restriction of air may increase an amount of heat generated by the combustion of fuel in cylinders 16, resulting in higher-temperature exhaust that exits engine 14 and is encountered by exhaust temperature sensor 74 and EGR valve 40. The temperature of exhaust gas may be monitored based on exhaust temperature signal 120, while ITV 36 is maintained in a restrictive position, to raise the temperature of exhaust gas to the predetermined temperature threshold. The performance of step 320, in which EGR valve 40 is repeatedly actuated, may be delayed during step 318 until the temperature of exhaust gas reaches the predetermined temperature threshold or a higher temperature. Once exhaust temperature signal 120 indicates that the temperature of exhaust is equal to or greater than this threshold, step 320 may be performed.

During step 320, ECM 80 may transition from performing control with closed loop control module 82 to performing control with open loop control module 84. Open loop control may include generating EGR command 220 that seeks to repeatedly open and close EGR valve 40. When EGR valve 40 is stuck, repeated signals for actuator 45, in combination with elevated exhaust temperatures, may remove deposits from EGR valve 40 and free a stuck valve plate of valve 40 and/or remove deposits from valve 40.

Step 320 may include generating signals to actuator 45 of EGR valve 40 that alternate between high and low levels. For example, when EGR valve 40 is electrically-actuated, step 320 may include applying a high-current (e.g., a high duty-cycle PWM signal or a continuous high-current signal) for opening valve 40. To avoid overheating actuator 45 of valve 40, the high-current signal may be gradually reduced and/or applied in a series of pulses. For example, step 320 may include simulating a kick effect by generating a high-current signal for a first period of time (e.g., 50 ms), and generating a lower-current signal for a second, longer, period of time (e.g., 250 ms). The alternating high-current and lower-current signals may be repeated in order to free or clean EGR valve 40.

FIG. 4 is a chart illustrating exemplary energy level 402, 404, 406 that represent an amount of energy (e.g., current amplitude), or actuation force, that may be applied by supplying electrical energy to actuator 45 in at least some embodiments. Energy level 402, 404, and 406 each represent an amount of current supplied to actuator 45 to drive EGR valve 40 to an open position or closed position. Open loop control module 84 of ECM 80 may be configured to select one of energy level 402, 404, 406 based on a detected temperature condition associated with EGR valve 40 within a time window which has a maximum duration indicated by the time axis of FIG. 4. For example, based on exhaust temperature signal 120, EGR evaluation module 86 may select one of these energy level 402, 404, 406 while performing step 320 as part of the process for cleaning EGR valve 40. Energy level 402 may be applied in a relatively low-temperature condition, and may therefore apply a relatively high level of force without overheating the actuator of EGR valve 40. Energy level 404 may correspond to an intermediate temperature condition, while energy level 406 corresponds to a high temperature condition.

During step 320, a suitable energy level, such as one of energy levels 402, 404, 406 or another suitable energy level, may be applied to actuator 45 of EGR valve 40.

In one embodiment, an on-off waveform may be applied to actuator 45 of EGR valve 40 to periodically apply energy having a predetermined energy level separated by period during which no energy is supplied. In such a waveform, the "ON" state of the on-off waveform may be a state in which a desired (e.g., approximately constant) energy level is supplied to the actuator 45 of EGR valve 40, while the "OFF" state of the on-off waveform may be a state in which no energy is supplied to actuator 45 of EGR 40. In another embodiment, a high-low rectangular waveform or triangular waveform may be applied to actuator 45 of EGR valve 40 to apply energy at a desired energy level. The "HIGH" state of the high-low waveform may be a state in which 100%, or a maximum desired energy level, is supplied to actuator 45 of EGR valve 40, while the "LOW" state of the high-low waveform may be a state in which a lower level energy (e.g., less than 40% of the maximum desired energy level) is supplied to actuator 45 of EGR 40.

The waveform may be applied repeatedly, beginning with a relatively high amount of energy, and thus force, in order to free a moveable member, such as a valve plate. The amount (e.g., current) of supplied energy may decrease over time when an actuator internal temperature increases due to the energy consumption, preventing excessive heating of actuator 45. Once freed, position feedback information may be received by ECM 80. The process may be repeated a predetermined number of times by closing and re-opening EGR valve 40. Alternatively, this process may be performed until EGR evaluation module 86 determines that EGR valve 40 moves freely based on position feedback information. At the conclusion of this cleaning operation, ITV command 210 and EGR command 220 may again be generated according to closed loop control module 82, and method 300 may return to step 302.

The system and method of the present disclosure may enable the use of an electrically actuated valve mechanism in an exhaust gas recirculation valve, while avoiding sticking issues introduced due to deposits. The disclosed methods and systems may enable the use of a low-torque electromechanical valve by removing deposits, removing the need to employ a costly high torque hydraulically-actuated EGR valve. Additionally, an EGR sticking condition may be readily identified, enabling prompt action to return the EGR valve to working condition. Following the identification of a sticking condition, or during periodic cleaning of an EGR valve, an exhaust temperature is elevated to a desired level quickly and efficiently.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method for cleaning an exhaust gas recirculation (EGR) valve, the method comprising:
   scheduling a cleaning for the EGR valve;
   receiving a signal indicative of a temperature of exhaust gas produced with an internal combustion engine;
   generating a command to actuate an intake throttle valve to a restrictive position to increase the temperature of the exhaust gas for cleaning the EGR valve;
   determining whether the temperature of the exhaust gas reaches at least a predetermined minimum temperature; and
   in response to determining that the temperature of the exhaust gas has reached at least the predetermined minimum temperature, generating a signal to repeatedly actuate the EGR valve, an amount of force for repeatedly actuating the EGR valve being based on the temperature of the exhaust gas.

2. The method of claim 1, wherein the EGR valve is repeatedly opened and closed after the temperature of the exhaust gas reaches or exceeds the predetermined minimum temperature, after delaying generating the signal to repeatedly actuate the EGR valve until the temperature of the exhaust gas has reached the predetermined minimum temperature.

3. The method of claim 1, further including:
detecting an amount of EGR leakage after determining that conditions of the internal combustion engine correspond to conditions suitable for detecting EGR leakage.

4. The method of claim 1, wherein the cleaning for the EGR valve is scheduled in response to determining that the EGR valve is unable to fully close.

5. The method of claim 1, wherein the EGR valve is downstream of an EGR cooler and the temperature of the exhaust gas downstream of the EGR cooler is increased to at least 100 degrees Celsius before generating the signal to repeatedly actuate the EGR valve.

6. The method of claim 1, wherein repeatedly actuating the EGR valve includes supplying energy in a waveform to an actuator of the EGR valve and causing the amount of energy supplied in the waveform to switch between a higher level and a lower level.

7. The method of claim 1, wherein repeatedly actuating the EGR valve includes generating a signal to repeatedly open and close the EGR valve while the intake throttle valve is in the restrictive position.

8. The method of claim 1, wherein the EGR valve is an electromechanically-actuated valve.

9. A method for cleaning an exhaust gas recirculation (EGR) valve, the method comprising:
generating a command to close the EGR valve and determining EGR leakage while the EGR valve is commanded to be closed;
in response to determining the EGR leakage, scheduling a cleaning for the EGR valve;
partially closing an intake throttle valve to facilitate the cleaning for the EGR valve; and
repeatedly generating a signal for supplying electrical energy to an actuator of the EGR valve for actuating the EGR valve, the electrical energy supplied as a series of pulses that each include a higher-current portion followed by a lower-current portion such that a current for the actuator decreases gradually from a current peak associated with the higher-current portion.

10. The method of claim 9, wherein the electrical energy is supplied to the actuator of the EGR valve such that the current for the actuator decreases continuously from the current peak associated with the higher-current portion in each pulse.

11. The method of claim 10, wherein the current for the actuator has an amplitude that is determined based at least in part on a temperature associated with an internal combustion engine.

12. The method of claim 9, wherein repeatedly generating the signal for actuating the EGR valve includes generating a signal for opening and closing the EGR valve.

13. The method of claim 9, wherein the intake throttle valve is partially closed to increase an exhaust temperature to at least a predetermined minimum temperature.

14. The method of claim 13, further including waiting until the exhaust temperature reaches at least the predetermined minimum temperature before repeatedly generating the signal for actuating the EGR valve.

15. The method of claim 9, wherein the higher-current portion is generated for a first period of time and the lower-current portion is generated for a second period of time, the first period of time being longer than the second period of time.

16. A system for removing material or preventing accumulation of material on an exhaust gas recirculation (EGR) valve, the system comprising:
an internal combustion engine;
an intake throttle valve;
the EGR valve;
a temperature sensor configured to generate a temperature signal indicating a temperature of exhaust gas; and
a controller configured to:
receive the temperature signal,
generate a command to actuate the intake throttle valve to a restrictive position, and
generate a command to repeatedly supply current to actuate the EGR valve while the intake throttle valve is in the restrictive position, an amplitude of the current being determined based on a detected temperature associated with the EGR valve.

17. The system of claim 16, wherein the controller is configured to generate the command to repeatedly actuate the EGR valve when the temperature signal indicates that the temperature of exhaust gas is at least a predetermined minimum temperature.

18. The system of claim 16, wherein the controller is configured to schedule a process that includes generating the command to repeatedly actuate the EGR valve, based on an amount of EGR leakage associated with the EGR valve.

19. The system of claim 18, wherein the amount of EGR leakage is determined by identifying EGR leakage after generating a command to close the EGR valve.

20. The system of claim 16, wherein the command to repeatedly actuate the EGR valve causes an actuator of the EGR valve to apply a force that decreases over time.

* * * * *